(12) United States Patent
Rademan et al.

(10) Patent No.: US 8,603,237 B2
(45) Date of Patent: Dec. 10, 2013

(54) METHOD AND COMPOSITIONS FOR IMPROVING PERFORMANCE PROPERTIES OF MAGNESIUM OXYCHLORIDE CEMENTS

(75) Inventors: Jerry Elliott Rademan, Jacksonville, FL (US); Ronald Wardle, Findlay, OH (US); Mark Shand, Findlay, OH (US)

(73) Assignee: Premier Magnesia, LLC, West Conshohocken, PA (US)

( * ) Notice: Subject to any disclaimer, the term of this patent is extended or adjusted under 35 U.S.C. 154(b) by 0 days.

(21) Appl. No.: 13/440,748

(22) Filed: Apr. 5, 2012

(65) Prior Publication Data

US 2013/0263759 A1    Oct. 10, 2013

(51) Int. Cl.
*C04B 9/04* (2006.01)

(52) U.S. Cl.
USPC .................. 106/685; 106/688; 106/801

(58) Field of Classification Search
USPC .......................................... 106/685, 688, 801
See application file for complete search history.

(56) References Cited

U.S. PATENT DOCUMENTS

| 6,395,084 | B1 | 5/2002 | Priest |
| 7,491,267 | B2 * | 2/2009 | Francis et al. ................ 106/690 |
| 7,744,693 | B2 * | 6/2010 | Mabey ........................ 106/801 |
| 2005/0059757 | A1 | 3/2005 | Bredt et al. |
| 2010/0006288 | A1 | 1/2010 | Santra et al. |

FOREIGN PATENT DOCUMENTS

WO          9419172 A1       9/1994

OTHER PUBLICATIONS

International Search Report Dated Jul. 1, 2013 received in International Application No. PCT/US2013/033678.

* cited by examiner

*Primary Examiner* — Paul Marcantoni
(74) *Attorney, Agent, or Firm* — Brian J. Colandreo; Jeffrey T. Placker; Holland & Knight LLP

(57) ABSTRACT

Despite the excellent properties associated with Magnesium OxyChloride (Sorel) based cements and Magnesium OxySulfate based cements, water and corrosion resistance has been limiting factors for achieving greater commercial applications. Such issues can be addressed by incorporating various alkali metal phosphates, such as Magnesium mono- or dihydrogen phosphate ($MgHPO_4$ or $MgH_2PO_4$) with alkali metal fatty acids; such as Magnesium Stearate; and metal or alkali metal sulfates such as Aluminum Sulfate or Magnesium Sulfate. Water resistance is further enhanced by either pre-carbonating the mix water or the liquid magnesium chloride phase of the cements, or by adding a carbonate into the powder phase. Accelerated cure of this system has also been obtained by using various inorganic metal oxides. Additionally, improved corrosion resistance is achieved through the use of certain phosphates, zeolites, nitrites and other novel additives.

54 Claims, 9 Drawing Sheets

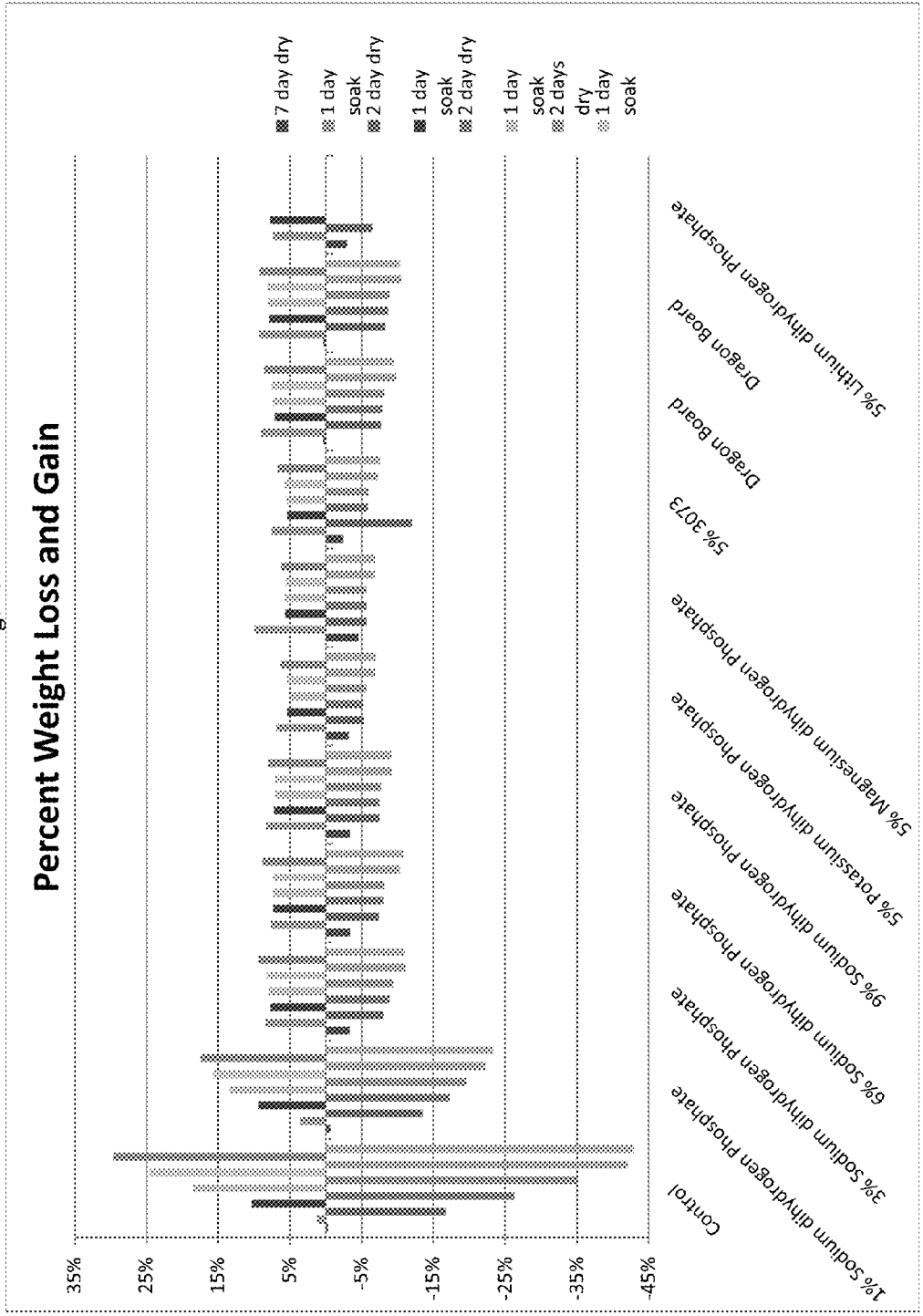

METHOD AND COMPOSITIONS FOR IMPROVING PERFORMANCE PROPERTIES OF MAGNESIUM OXYCHLORIDE CEMENTS

BACKGROUND OF THE DISCLOSURE

Magnesium OxyChloride ("MOC") cement was developed by Stanislaus Sorel in 1867. This cement binder technology provides inherently excellent properties such as fire retardancy; mold, algae and insect resistance; high compressive strengths, tenacious bonding characteristics and unmatched impact resistance. Due to these and other excellent properties, MOC cements have found good, but limited utility when used as the binder system for a multitude of applications ranging from high strength construction boards, industrial monolithic flooring concretes, patch repair concretes and mortars, as the binder system for billiards balls and many other applications. The biggest limiting factor for increased use of MOC binder systems has been the inherent lack of water resistance during the early cure stages, e.g., during the first months of curing. This limiting performance property is accentuated when finished products are used for outdoor applications, or where exposure to water may occur even in interior applications.

Studies have shown that upon ingress of water into the MOC cement matrix, the water causes efflorescence, or leaching of the Magnesium Chloride ($MgCl_2$) salt. The resultant matrix after leaching includes a higher concentration of Magnesium Hydroxide, which is a much weaker binder matrix than Magnesium OxyChloride.

Various technologies have been tried by many cement and concrete technologists with limited to no benefits. All of the known water resistant additives that are typically incorporated into Ordinary Portland Cement ("OPC") mortars or concretes have either no effect, or will even worsen the MOC cement properties.

Another major problem associated with MOC cements is that chlorides are present in the cement matrix, even after full cure. These chloride ions can be highly detrimental (corrosive) to metals that are used to either fasten MOC-based construction panels, or to metals that may be used to reinforce concrete structures, such as steel reinforcing bars (rebar). This disclosure addresses the use of phosphates, and various nitrites such as Magnesium Nitrites, and/or various zeolite additives that overcome these corrosion issues. As an example, an exterior MOC construction wall board formulation with both water and corrosion resistance in accordance with the disclosure can include:

| Composition: | % by Weight: |
| --- | --- |
| MgO - 3% active lightly calcined | 21 |
| MgCl2 - 220 Baume Solution | 15 |
| H20 | 15 |
| MgH2PO4 (for water resistance) | 3 |
| Zeolite (for corrosion resistance) | 2 |
| Mg Nitrite (for corrosion resistance) | 3 |
| Expanded Polystyrene Beads (EPS) | 8 |
| Recycled carpet fibers | 11 |
| Fly Ash - Class C | 20 |
| Fiberglass Mesh Scrim | 2 |

Another issue associated with MOC cements is that although cure speed is much faster than conventional Portland cements, even faster cure speeds are desirable in applications such as construction board manufacturing and fast-setting repair mortars, etc. The use of the magnesium phosphate water resistant additive in combination with various metal oxide pigments, such as, for example, iron oxide, copper oxide, zinc oxide and titanium oxide, was found to have accelerated MOC cure times.

SUMMARY OF THE DISCLOSURE

The compositions discussed herein have been found to provide unexpected improvements in water resistance, sufficient enough to allow MOC-based products to be used in applications that have been restricted until now. The technology includes using different alkaline metal phosphates such as Magnesium mono and di-hydrogen phosphate, in combination with alkai metal soaps such as Magnesium Stearate and Magnesium Oleate.

Additionally, it has been observed that when MOC-based mortars and concretes are exposed to outdoor environments and are not unduly damaged, e.g., by cracking and spalling caused by the initial harmful effects of water ingress during the first few months period, their water resistance is greatly improved over time. This is due to the fact that MOC cements and concretes can absorb carbon dioxide ($CO_2$) from the atmosphere to form a Magnesium Carbonate OxyChloride matrix. Embodiments of the process CO2 directly into the cement mix to pre-carbonate the MOC matrix early in its cure stages. Obtaining early carbonation provides early water resistance, especially when an alkali metal phosphate and alkali metal fatty acid are included in the mix design. A process in accordance with the disclosure can include pre-carbonating and aerating MOC-based construction materials by feeding in pressurized CO2 into the cement matrix with the pressurized feeding of proteinaceous surfactants or other aerating agents into the matrix.

A first implementation of the disclosure provides an improved water resistance of Magnesium OxyChloride (MOC) cement and concrete with ratios of $MgO:MgCl_2:H_2O$ ranging from about 3:1:5 to about 10:1:17 (e.g., a three phase mix to a ten phase mix), in combination with various alkali metal phosphates alone and in combination with specific alkali metal fatty acids soaps and/or either metal sulfates or alkali metal sulfates such as aluminum sulfate, copper sulfate, zinc sulfate and iron sulfate; and also with or without colloidal silica. It was found that all of the alkali metal phosphates, metal sulfates and alkai metal sulfates were effective within the usage range of approximately 0.1% -approximately 10% by weight of MgO.

BRIEF DESCRIPTION OF THE DRAWINGS

FIG. 9 is a graph of test weight change results in accordance with the disclosure.

DETAILED DESCRIPTION OF PREFERRED EMBODIMENT

Figure 1:
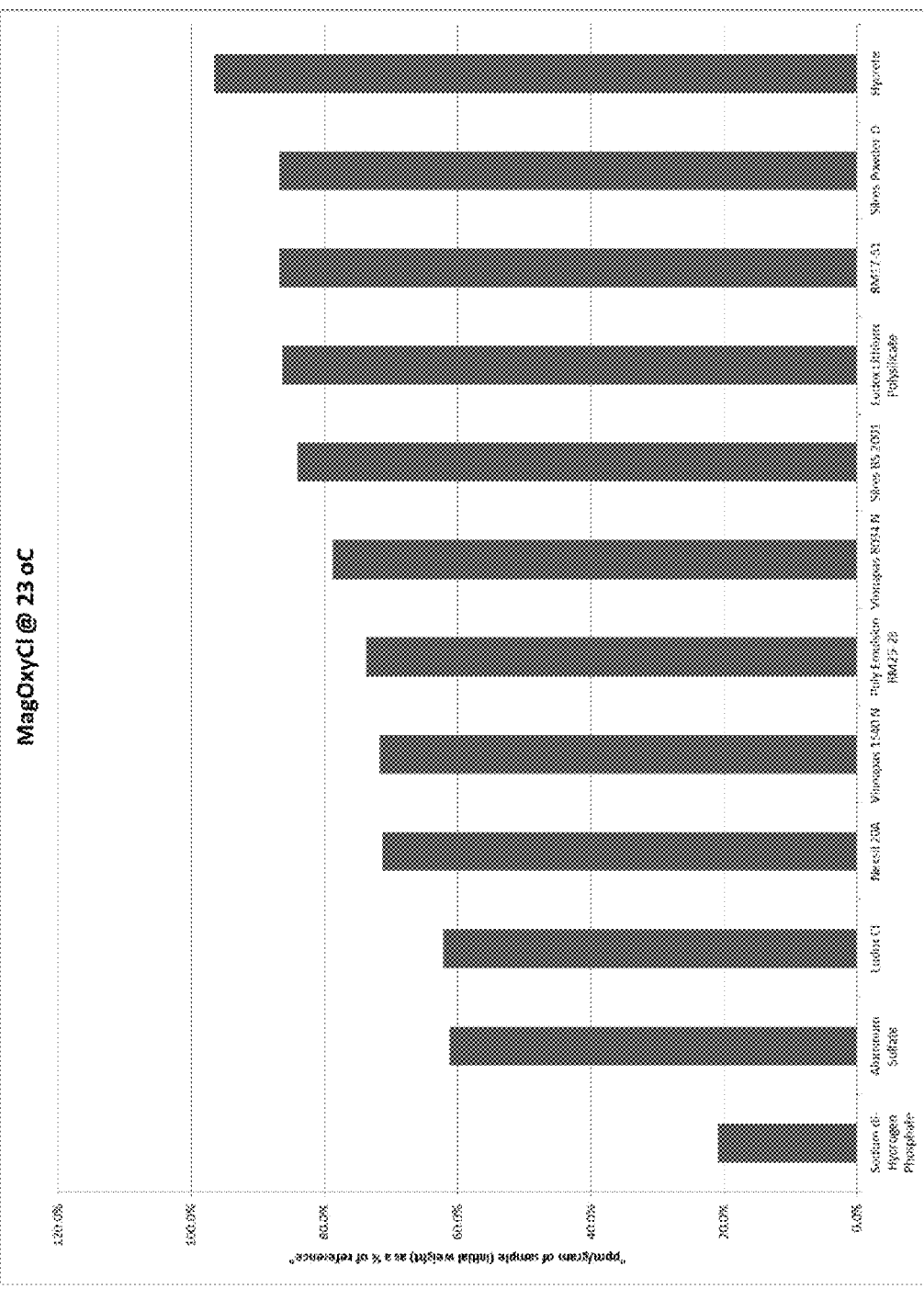
FIG. 1 is a graph of test results in accordance with the disclosure.

In an effort to address the inherent issues associated with Magnesium OxyChloride (MOC) cements and concretes, a multitude of experiments were run to find the answer to these age old problems. Therefore, various MOC mix designs were tested with molar mix ratios of Magnesium Oxide:Magnesium Chloride:Water ranging from about 1:1:7 to about 10:1:22. The most typical ratios commonly used for MOC cements range from 3, 5 and 7:1 ratios of MgO:$MgCl_2$ and are referred to as a 3 phase, 5 phase and 7 phase MOC cement mix. As is known, the 5 phase formed includes a MgO:$MgCl_2$:$H_2O$ molar ratio of 5:1:13, with a slight excess of MgO and an amount of water as close as possible to theoretical required for formation of the 5 phase and hydration of the excess MgO to form $Mg(OH)_2$. There are a variety of grades of magnesium oxide that are effective in these MOC cements that range from light burned through dead burned grades, and calcined form natural or synthetic magnesite sources. As an illustrative example only an example of Magnesium oxide that can be used in accordance with the disclosure is Oxymag® available from Premier Magnesia, LLC, 300 Barr Harbor, Suite 250, West Conshohocken, Pa. 19548. In an example embodiment of the disclosure, the Magnesium chloride is generally a 22° Be solution. As an example only, one aqueous solution of Magnesium chloride preferably is a hexahydrate and includes about maximum of 0.5% calcium chloride and about 1.0% total alkali chlorides.

The testing program goal was to determine the effects of various admixture and process approaches for obtaining enhanced water resistance properties. Experiments were run measuring water absorption properties as well as related corrosion resistance properties of the matrix by measuring for Chloride ion extraction. This was obtained by making 2" cubes and 3½" disks, and after in initial 24 hours, immersing them into water for 28 days. Water absorption into the MOC matrix was measured by determining how much water weight gain occurred over various time intervals from day one of initial cure to 28 days. Using ASTM C1152 (acid soluble chloride) and ASTM C1524 (Soxhlet water soluble determination), Chloride ion extractions were measured both at the surface of the cubes, and also by crushing the cubes and measuring free chloride ion over various time intervals.

To compare results to a control, no additive was used in testing of these mixes for physical properties and water resistance, and then added various known water resistant admixtures that typically enhance water resistance properties of other concrete matrices such as Portland cement. These admixture compounds based on alkyl alkoxy siloxanes, alkyl alkoxy silanes, silicone dispersions, alkali metal silicates, latex resin dispersions, lithium compounds, silica fume, fatty acids (alone), and an alkyl succinate. The test procedures, experimental materials, and results of these tests are outlined as follows:

Experimental Procedures

Thirteen mixes (12 additives and a reference) were produced and samples were cast from each mix. Leaching of chlorides in water was conducted on disks. A single cube was cast from each mix to determine general strength levels at seven days.

Initial developmental work was conducted using magnesium oxide and an industrial magnesium chloride deicer. Using molar proportioning, various mixes were made ranging from about 10:1 to about 5:1 MgO:$MgCl_2$ and about 18:1 to about 13:1 $H_2O$:$MgCl_2$.

Three initial mixes at 7:1 MgO:$MgCl_2$ and 18, 17, 16 to 1$H_2O$:$MgCl_2$ were produced. One day compressive strengths, that is the day after the initial 24 hour cure, increased with decreasing water from 2000 psi to 4000 psi. The water contained in the additives/chemicals, as well as the water of crystallization was deducted from the water used to dissolve the $MgCl_2$ so that $MgCl_2$ concentrations ranging from 51% to 54% were used to make the cement. Each batch of $MgCl_2$ was made separately and cooled to room temperature before using. The $MgCl_2$ solution was mixed with the MgO, and then the experimental additive was added with constant agitation. The only exception was the aluminum sulfate which was dissolved in the $MgCl_2$ solution prior to being added to the MgO.

Three 3½"×0.5" disks and one 2"×2"×2" cube were fabricated from each batch. The average size of a batch was 780 grams. The specimens were de-molded after 24 hours and stored in a 50% RH/23° C. room for seven days. The cubes were weighed and tested for compressive strength at seven days after the initial 24 hour period. After this period, the disks were weighed and placed in 600 ml of de-ionized water for 24 hours. After 24 hours, 1 ml of the 600 ml solution was mixed with 50 ml of 10% nitric acid and 3 ml of hydrogen peroxide. The chloride ion concentration was determined by titration with silver nitrate. The disks were then stored in a 50% RH, 23° C. room, for 48 hours of drying and then placed back in 600 ml of de-ionized water. This testing regime was repeated for three cycles.

Experimental Materials

Additives were selected and calculations made to maintain an average molar ratio of 8MgO:1$MgCl_2$:18$H_2O$, and assumes that the $MgCl_2$ is the hexahydrate ($MgCl_2.6H_2O$) version. The actual base magnesium cement composition of an example in accordance with the disclosure is listed in Table 1 and is shown by weight ratios of the actual mix design used in this experimentation.

TABLE 1

| Ingredient & % Purity | Weight (grams) |
|---|---|
| Magnesium Oxide - 93.35% | 326 |
| Magnesium Chloride >95% | 224 |
| Water | 214 |

The water was adjusted to maintain a constant $H_2O$ to $MgCl_2$ ratio. A list of the additives and their additions by weight of MgO is listed in Table 2. Results are shown in FIG. 1 and in FIG. 2.

TABLE 2

| Additive | Properties | % solids addition by weight of MgO |
|---|---|---|
| Siliconized Polymer A | Polymer | 5 |
| Siliconozed Polymer B | Polymer | 5 |
| Poly Acrylic Emulsion | Polymer-wax | 4.6 |
| Lithium polysilicate | silicate | 3.2 |
| Colloidal Silica | Colloidal silica | 5 |
| Aluminum-coated Silica | Colloidal silica coated with alumina | 5 |
| Aqueous Silane Emulsion | silane | 1 |
| Silane polymer Resin | silane | 1 |
| Parrafinic Wax | wax | 5 |
| Na di-hydrogen Phosphate | phosphate | 5 |
| Succinate-based resin | Water repellent | 6.9 |
| Aluminum Sulfate | Alumina | 3.9 |

Compressive Strength Data

Figure 3:
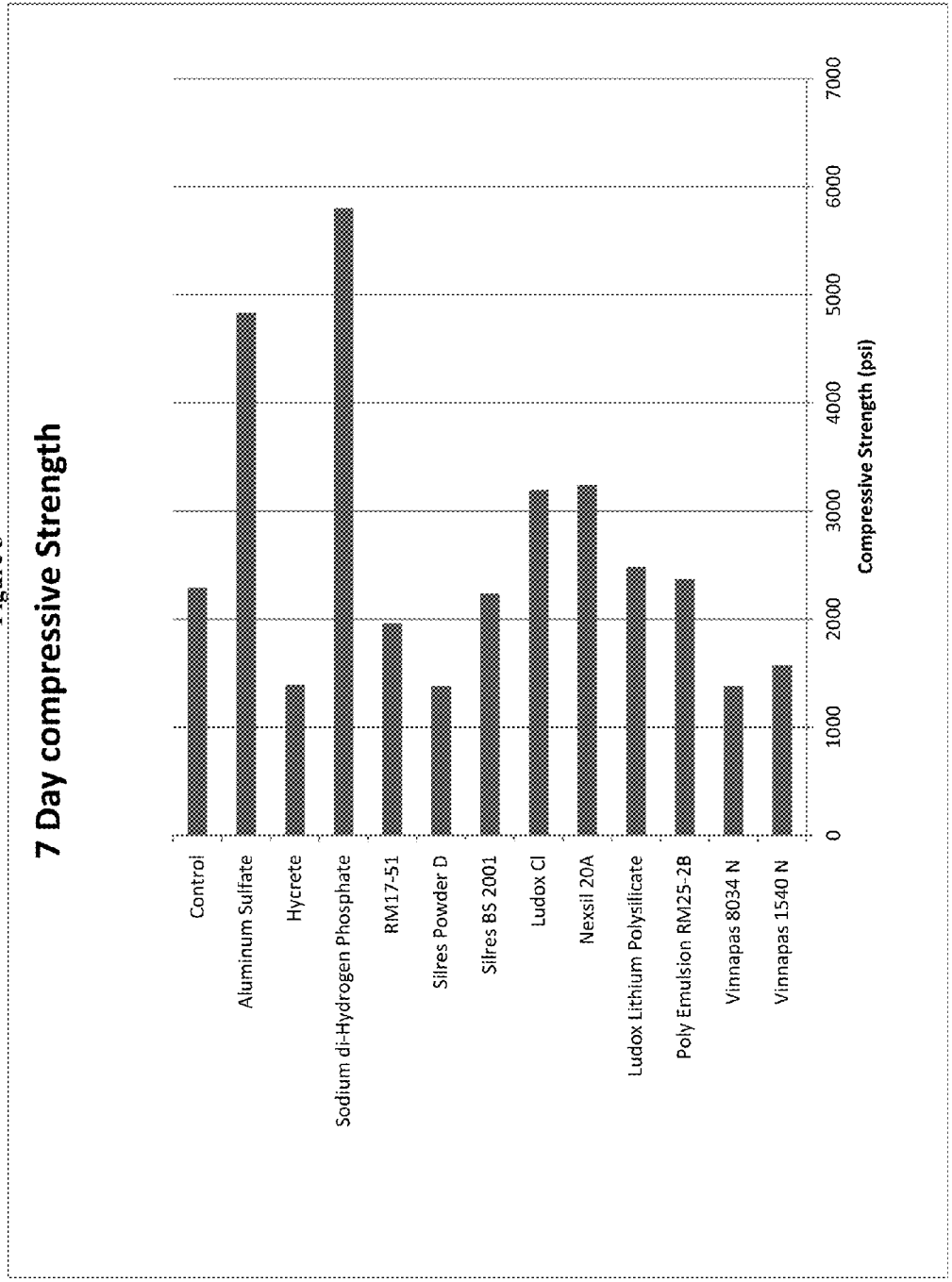
FIG. 3 is a graph of compressive strength test results in accordance with the disclosure.

There were variations in compressive strength. The strength data represents a single cube tested at seven days after the test specimens were poured. The data is presented in FIG. 3

Figure 4:
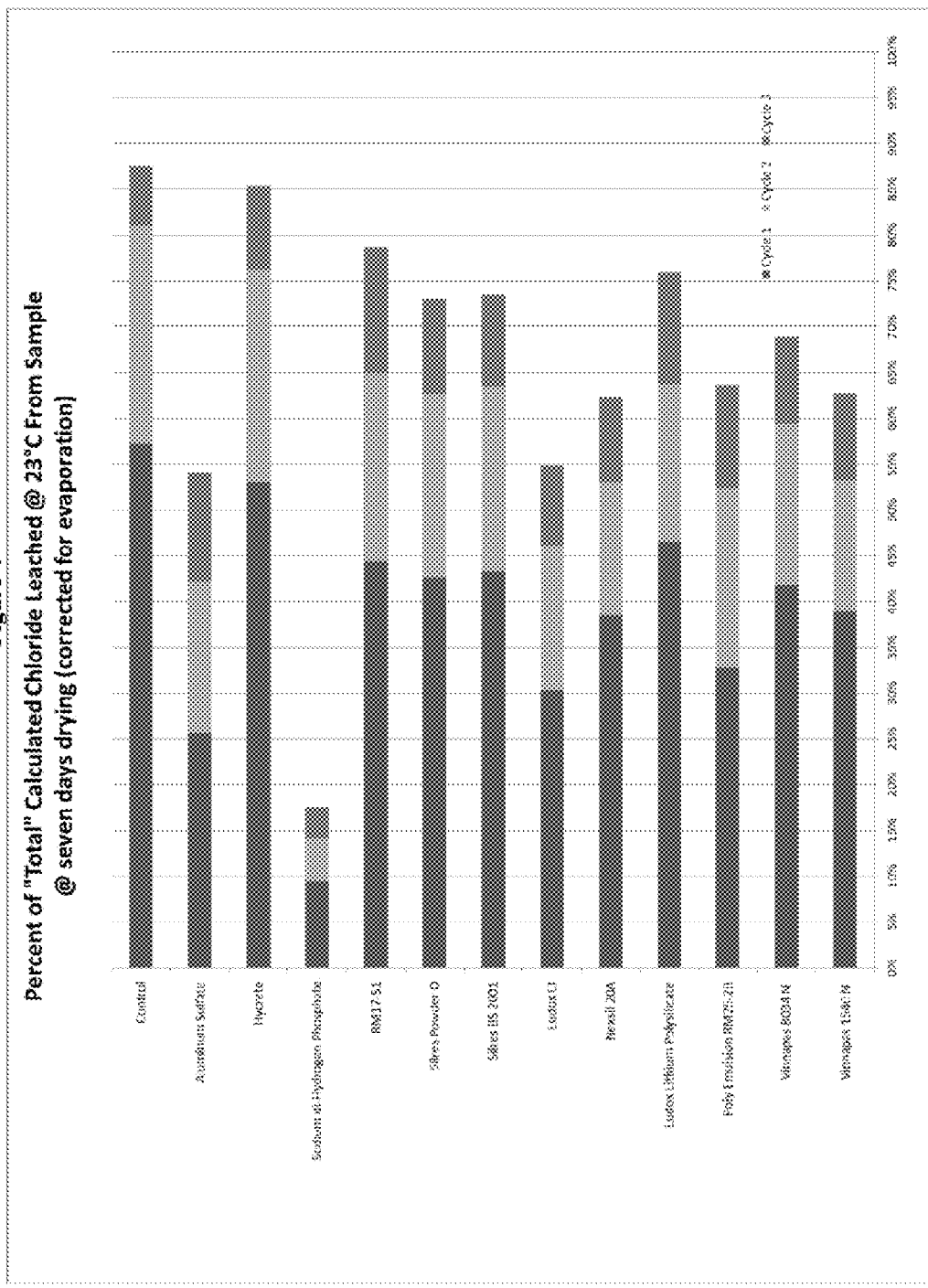
FIG. 4 is a graph of test chloride leaching results in accordance with the disclosure.

The overall loss of chloride for all three soak cycles is shown below in FIG. 4. Lower values indicted less of the integral chloride was leached out.

Other Observations

While experimenting with the different $H_2O$—$MgCl_2$ ratios two sets of cubes were stored in 100% RH/23° C. for 6 days after the initial 25 hour period. When the cubes were removed the 17:1$H_2O$:$MgCl_2$ had swelled above the top of the cube 1/8" while the 16:1$H_2O$:$MgCl_2$ had horizontal cracks running around the entire surface. The difference in water between these two tests was 19 grams or 2.5% of the total batch weight. This implies that minor changes in the water ratio may greatly impact the properties of the cement.

Figure 5:
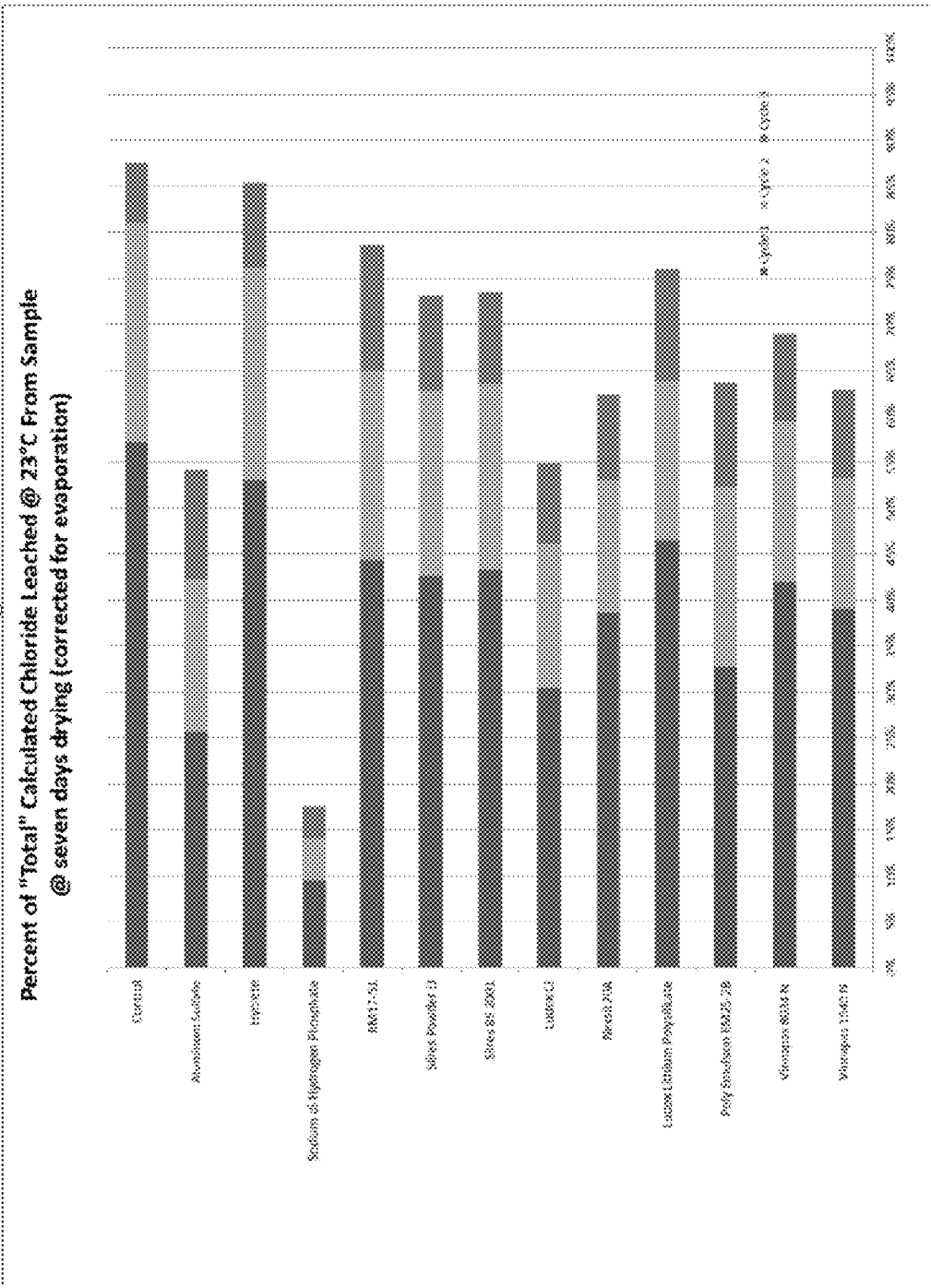
FIG. 5 is a graph of test weight change results in accordance with the disclosure.

A secondary observation was the loss and gain of weight during the test. This information is presented in FIG. 5.

After the last soaking cycle the samples were weighed then dried for 24 hours at 100° C. The samples were then ground by hand in a mortar and pestle and analyzed for chloride content. There is good agreement between the estimated chloride content from the leaching cycles (remaining chloride based on the amount lost via leaching) and the chloride titration of the dried samples.

Conclusions of Phase 1 Testing

Figure 2:
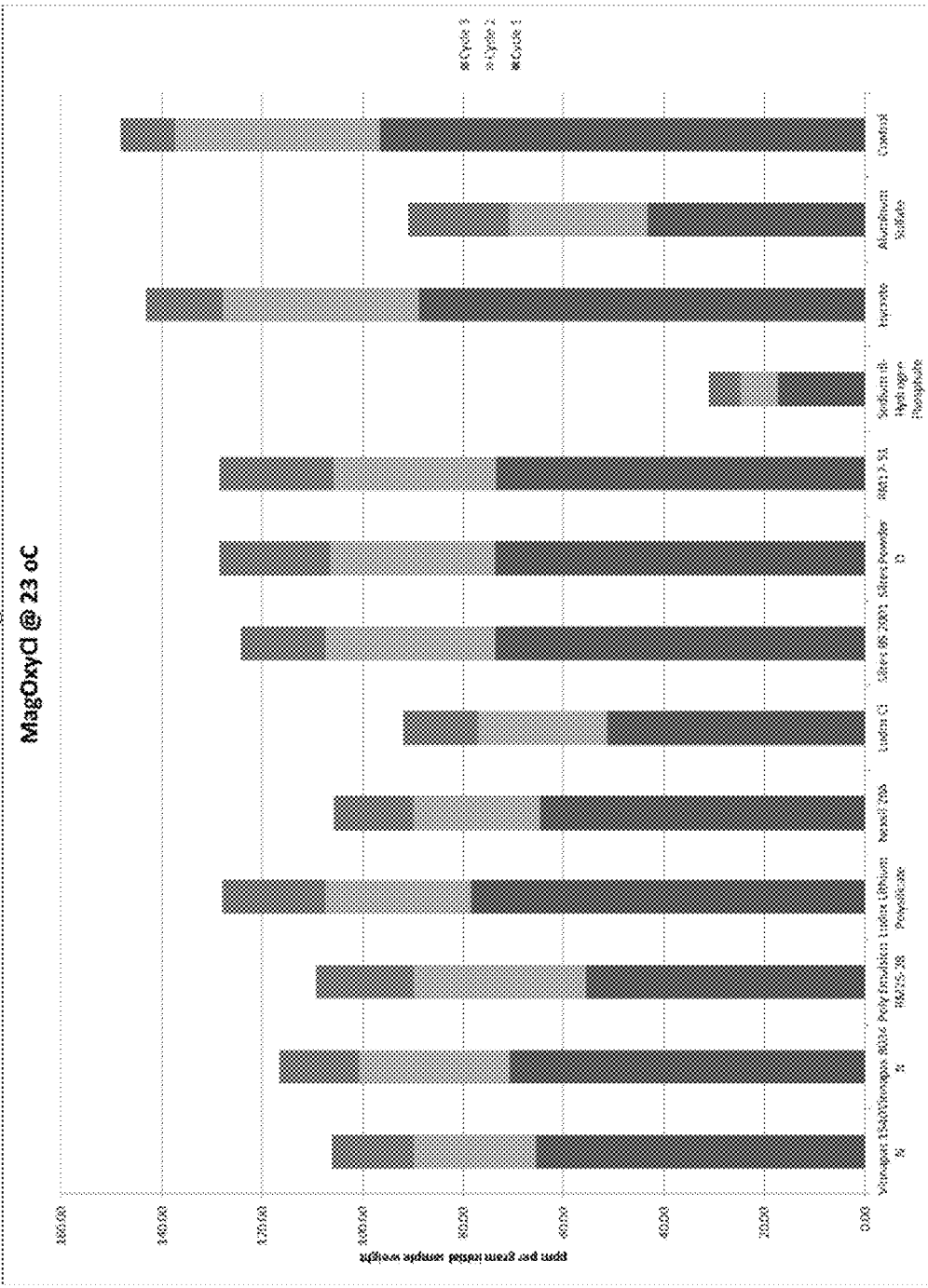
FIG. 2 is a graph of test results in accordance with the disclosure.

Of the twelve additives tested, when assessed exclusively on chloride leached, several showed some positive results. The performance of the materials is presented in FIGS. 1 and 2. FIG. 1 represents the total ppm chloride leached per gram of sample, as a percent of the ppm/gram of the reference (100% would be approximately the same ppm/gram leached as the reference). FIG. 2 compares the relative cumulative ppm/gram of the various samples by cycle. The most successful and most unexpected sample tested was the sodium di-hydrogen phosphate. An even better performance can be accomplished by adding magnesium stearate, aluminum sulfate or magnesium sulfate with the sodium di-hydrogen phosphate.

These results show that it is possible to reduce the amount of chloride leaching from magnesium oxychloride cement though the use of additives. The most promising additives are the sodium di-hydrogen phosphate followed by aluminum sulfate and colloidal silica for the 7:1 MgO:$MgCl_2$ and 17:1 $H_2O$:$MgCl_2$ ratios. It is assumed that this trend would stay the same for other ratios.

As can be seen from this testing, little or no improvements were observed in water resistance with eleven out of the twelve admixtures tested. Significant improvements in water resistance were obtained with the sodium di-hydrogen phosphate admixture product.

After obtaining positive results with the sodium di-hydrogen phosphate, Phase 2 testing was initiated comparing a variety of other alkali metal phosphates to this first finding.

Phase 2 Testing Procedures

Each additive was mixed in two batches with ten (10)-2" cubes and two (2)-3.5" diameter×0.5" thick disks cast. Compressive strength was determined at 1, 3, 7 and 28 days. In addition, one cube from each mix was cured in air for 7 days and then soaked in de-ionized water for 24 hours and then tested in compression. After curing at 23° C. and 50% RH for 7 days one disc was immersed in de-ionized water while the other was left to dry. Five soak cycles were completed with a two day dry cycle in between each soak.

Materials

The same ratio of MgO to $MgCl_2$ and $MgCl_2$ to $H_2O$ was used as the above experiments and all mixes were proportioned identically except for the magnesium phosphate which used less water since it is a tri-hydrate.

TABLE 3

| Ingredients (grams) | Weight of additive | MgO (91.08%) | $MgCl_2 \ast 6H_2O$ (98%) | $H_2O$ |
|---|---|---|---|---|
| Control | | 652 | 448 | 428 |
| 1% Sodium dihydrogen Phosphate | 6.52 | 652 | 448 | 428 |
| 3% Sodium dihydrogen Phosphate | 19.56 | 652 | 448 | 428 |
| 6% Sodium dihydrogen Phosphate | 39.12 | 652 | 448 | 428 |
| 9% Sodium dihydrogen Phosphate | 58.68 | 652 | 448 | 428 |
| 5% Potassium dihydrogen Phosphate | 32.6 | 652 | 448 | 428 |
| 5% Magnesium dihydrogen Phosphate | 32.6 | 652 | 448 | 419 |
| 5% 3073 | 32.6 | 652 | 448 | 428 |
| 5% Lithium dihydrogen Phosphate | 32.6 | 652 | 448 | 428 |

Conclusions of Phase 2 Testing

Figure 6:
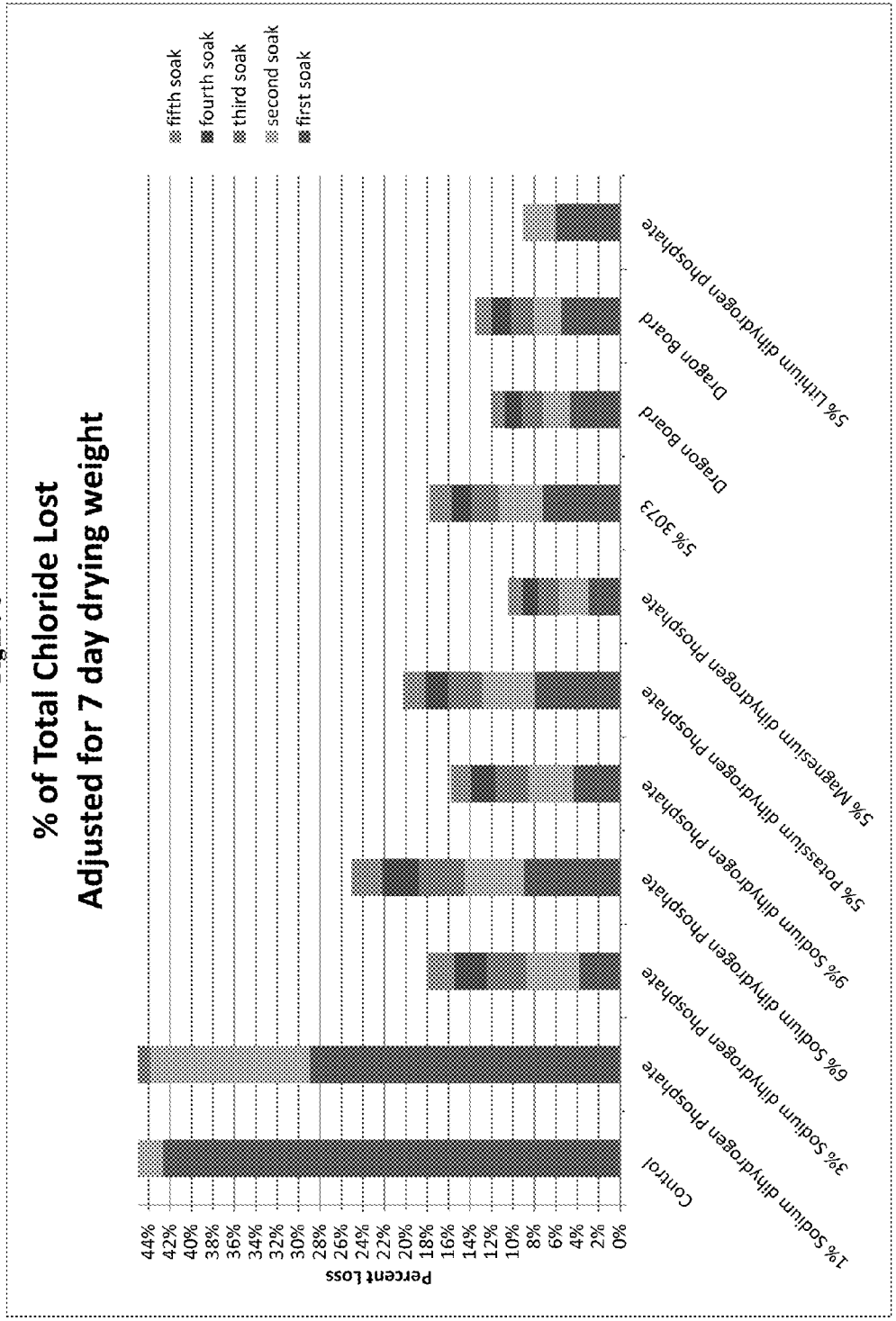
FIG. 6 is a graph of test chloride loss results in accordance with the disclosure.

As shown in the percent loss of chlorides illustrated in FIG. 6, the loss of chloride over five soak cycles was reduced most effectively by the 5% addition of magnesium di-hydrogen phosphate. The magnesium di-hydrogen phosphate and lithium di-hydrogen phosphate also had the least chloride loss for the initial 24 hour soak, which corresponds to the first soak shown in FIG. 6. In view of the experiments and analysis herein, the mono-hydrogen phosphates of Magnesium and Lithium and also be used in accordance with the disclosure, and should provide similar desired water resistance results as their di-hydrogen counterparts.

TABLE 4

Chlorides % loss of chlorides from total corrected for 7 day weight loss

| | first soak | second soak | third soak | fourth soak | fifth soak | Total |
|---|---|---|---|---|---|---|
| Control | 42.7% | 31.4% | 19.5% | 10.9% | 3.9% | 108.5%* |
| 1% Sodium dihydrogen Phosphate | 28.9% | 15.0% | 9.5% | 7.6% | 6.3% | 67.3% |
| 3% Sodium dihydrogen Phosphate | 3.9% | 4.9% | 3.7% | 3.0% | 2.4% | 17.9% |
| 6% Sodium dihydrogen Phosphate | 9.0% | 5.5% | 4.3% | 3.4% | 2.9% | 25.0% |
| 9% Sodium dihydrogen Phosphate | 4.3% | 4.3% | 3.0% | 2.3% | 1.9% | 15.8% |
| 5% Potassium dihydrogen Phosphate | 8.0% | 4.9% | 3.1% | 2.2% | 2.1% | 20.2% |
| 5% Magnesium dihydrogen Phosphate | 3.0% | 2.8% | 1.9% | 1.4% | 1.3% | 10.4% |

TABLE 4-continued

Chlorides % loss of chlorides from total corrected for 7 day weight loss

|  | first soak | second soak | third soak | fourth soak | fifth soak | Total |
|---|---|---|---|---|---|---|
| 5% 3073 | 7.3% | 4.1% | 2.5% | 1.9% | 2.0% | 17.8% |
| Dragon Board | 4.7% | 2.5% | 1.9% | 1.7% | 1.32% | 12.1% |
| Dragon Board | 5.5% | 2.6% | 2.1% | 1.9% | 1.47% | 13.5% |
| 5% Lithium dihydrogen phosphate | 6.04% | 3.05% | testing halted after 2 cycles |  |  | 9.1% |

*because of the high concentration of chlorides in the control only 1 ml of leachant was used for analysis resulting in a slight cumulative error When the seven day compressive strength of the air dried cubes is compared to the compressive strength of the dried then soaked cubes, there is some concern if potassium di-hydrogen phosphate is a viable additive. There was an almost complete loss of strength for the cement containing the potassium phosphate.

Figure 7:
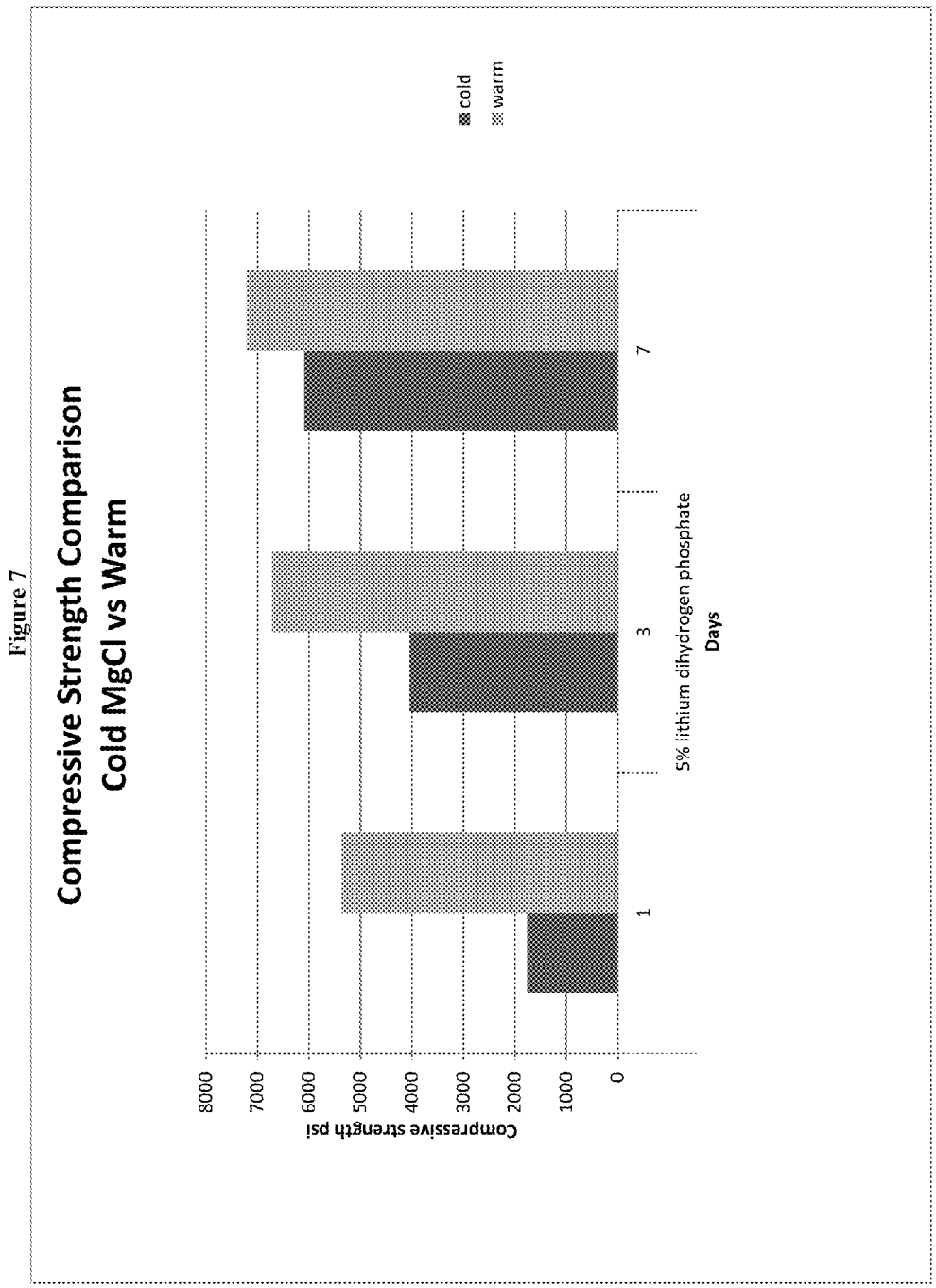
FIG. 7 is a graph of test compressive strength results in accordance with the disclosure.

All of the testing was done with a solution of $MgCl_2$ that was slightly warmer than room temperature, approximately 75° F. with the exception of one of the batches containing the lithium di-hydrogen phosphate. One was made with a solution that was slightly lower than room temperature, approximately 70° F. The cubes made from the two different batches were visually different, so they were tested separately. The disks were made from the solution with the higher temperature (consistent with all other disks). FIG. 7 shows a remarkable difference in one day compressive strength with a very slight temperature difference in $MgCl_2$ solution temperature. It appears, at least for lithium di-hydrogen phosphate, that the temperature of the solution may have a significant effect on the compressive strength and perhaps other properties.

Experimental Materials

Additives were selected and calculations made to maintain the desired molar ratio of MgO, $MgCl_2$ and $H_2O$, which is approximately 7.5:1:18 respectively. The base magnesium cement composition is listed in Table 5. The volume of the $MgCl_2$ listed in Table 4 was calculated to be 720 ml and a large batch of solution was made to expedite the multiple magnesium oxychloride mixes need for the test. The temperature of the $MgCl_2$ solution was slightly above the 23° C. room temperature, such as 24° C.

TABLE 5

| Ingredient | Weight (grams) |
|---|---|
| Magnesium oxide 91.08% | 652 |
| Magnesium chloride >98% | 448 |
| water | 428 |

Experimental Procedure

The same approximate ratio as the above series was used: 7:1 $MgO:MgCl_2$ and 17:1 $H_2O:MgCl_2$ as the base mix. A 2" diameter high shear mixing head was used at 3000 rpm to mix two batches of cement per additive. The materials were mixed for 2.5 minutes before being poured into the molds.

Two (2) 3.5" disks and ten (10) 2"×2"×2" cube were made for each experiment. The cubes were cured at 23° C. and 50% RH then tested for compressive strength at 1, 3, 7, and 28 days, which are close to ASTM industry accepted time intervals for curing MOC cements. In addition one cube, after curing for 7 days, was soaked in de-ionized water for 24 hours and then tested for compressive strength. The disc specimens were de-molded after 24 hours and stored in a 50% RH 23° C. room for 7 days. One set of disks from each additive was maintained at 23° C. and 50% RH and periodically weighed over 28 days. The other set of disks were weighed and placed (individually) in 600 ml of de-ionized water for 24 hours. After 24 hours the disks were removed, weighed, and 1 ml of the 600 ml leachant solution was mixed with 50 ml of 10% nitric acid and 3 ml of hydrogen peroxide. The chloride ion concentration was determined by titration with silver nitrate. The disks were then stored in a 50% RH 23° C. room for 48 hours of drying and then placed back in 600 ml of de-ionized water. This testing was repeated for five cycles.

Summary of Results

Figure 8:
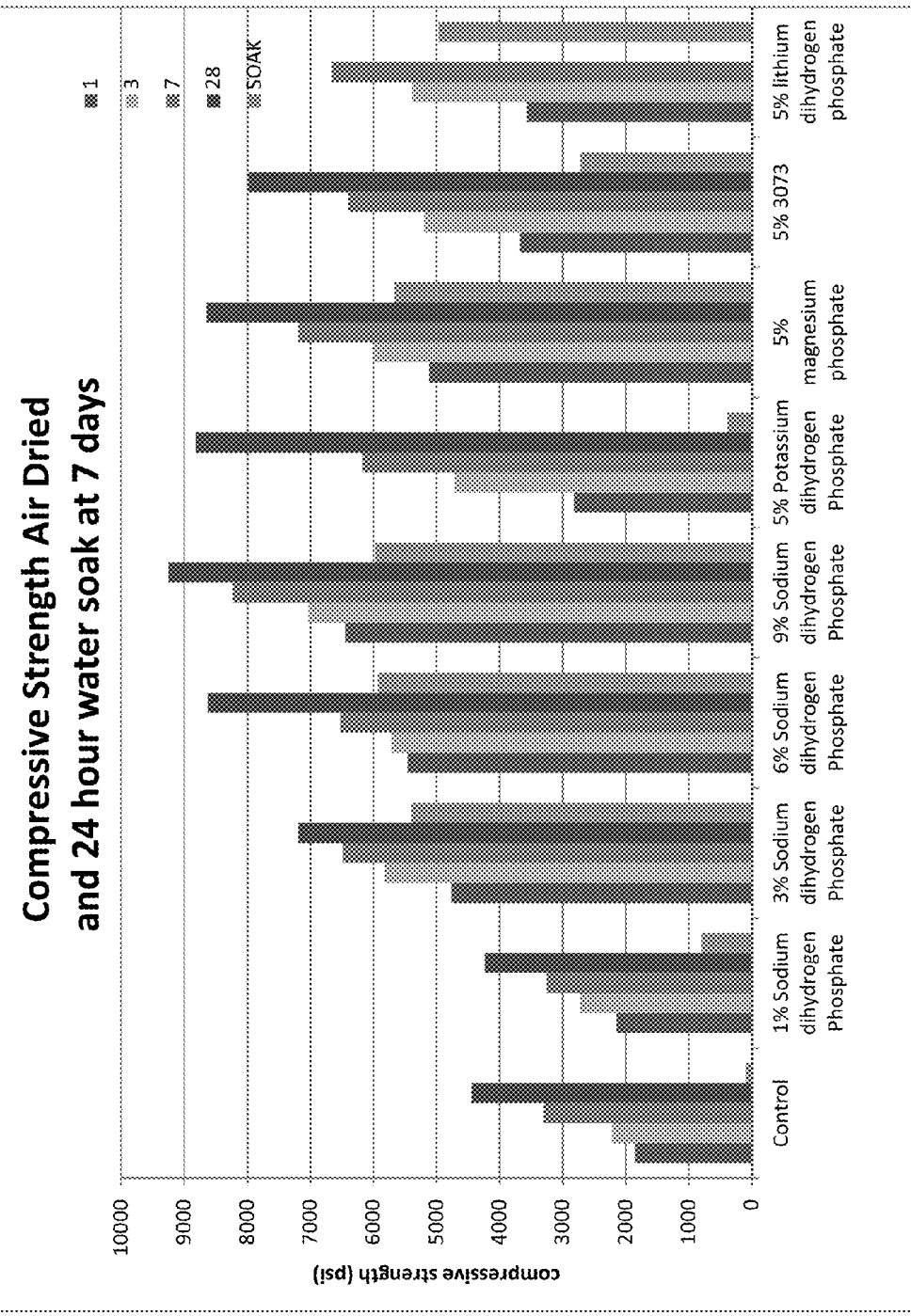
FIG. 8 is a graph of test compressive strength results in accordance with the disclosure.

Compressive strength as a function of time is shown in FIG. 8. A data point of note is the loss of strength of the control and 5% potassium di-hydrogen phosphate cubes, after exposure to water.

The alternate wetting and drying showed a similar pattern as the above experimental series. The control and 1% sodium di-hydrogen phosphate showed a gradual increase in weight loss and gain while the rest of the additives were more constant (FIG. 9). Factors that were different for this series of tests were increased agitation by the high shear blade and the slightly higher solution temperature of the $MgCl_2$ by just 1° C. This had little or no effect on the mix properties.

The 28 day drying curve for the disks were run. Although higher than the control and the 1% sodium di-hydrogen phosphate, the 5% magnesium di-hydrogen phosphate cement had the next lowest weight loss of the tests. Loss of weight may have an influence on shrinkage and warp.

Conclusions of Phase 1 and Phase 2 Testing

When considering the data in aggregate, the 5% addition of Magnesium di-hydrogen phosphate appeared to outperform all other additives tested. Specifically when comparing:
1. Chloride leaching from the sample over time.
2. Compressive strength loss after soaking for 24 hours in de-ionized water.
3. The compressive strength was nearly 200% that of the control and greater or equal to all but one of the additives.
4. Loss of weight by drying was lower than all of the additives with comparable chloride loss and compressive strength development.
5. Gain and loss of weight during the wetting and drying cycles was less than or equal to the other additives.
6. The addition of 5% magnesium di-hydrogen phosphate also outperformed the fully cured sample of "Dragon Board" (http://www.dragonboard.com/aboutus.php) in chlorides leached over time, as well as weight loss and gain over time. This is significant as the Dragon board was probably cured for at least one year and had ample time to fully carbonate.

The Phase 2 testing concluded that the sodium di-hydrogen phosphate, that was the best sample from Phase 1 testing, was not the best phosphate tested in the second series of test. Although it exhibited good water resistance, it was not nearly as good in compressive strength enhancements as: Magnesium di-hydrogen phosphate and Lithium di-hydrogen phosphate.

The effects of adding various alkali metal fatty acids and/or metal sulfates in combination with the best alkaline metal phosphates were tested, and found that these provided enhanced water resistance, chlorine ion leaching minimization and resultant corrosion protection. Alkaline metal fatty acids, such as, magnesium stearate or magnesium oleate are added at a level of 0.01-10.0% by weight of MgO. Reduced chloride ion leaching is important in various construction board applications as the corrosion of board uncoated or anode protected steel to be used allowing for lower cost fasteners, negating the need for using more expensive stainless steel fasteners. It also may allow for other metal reinforcement materials in an MOC cement or concrete formula, especially important in structural repair mortars. Magnesium Stearate and Magnesium Oleate outperformed the Calcium Stearate and Calcium Oleate tested in this series.

An illustrative example in accordance with the disclosure of a formula including both magnesium stearate at a level of 1.0 wt % and magnesium di-hydrogen phosphate at a level of 5.0 wt % is as follows;

Magnesium oxide—326 g
Magnesium chloride—224 g
Magnesium di-hydrogen phosphate—16.3 g
Magnesium stearate—3.3 g
Water—214 g The next, and equally important concept tested was the process of pre-carbonating MOC mixes to further improve water resistance of MOC-based cements, mortars and concretes. This can be obtained by various mechanisms, such as using adding a source of carbonate to the MOC-based cement composition, such as, for example: adding Trona ($Na_3(CO_3)(HCO_3)*2H_2O$), in the range of approximately 0.1-10% by weight of MgO, Soda Ash ($Na_2CO_3$) approximately 0.1-10% by weight MgO, and Sodium bicarb ($NaHCO_3$) approximately 0.1-10% by weight MgO; carbonated water saturated with carbon dioxide gas as the mix water; bubbling $CO_2$ into the mix water: or bubbling $CO_2$ into the $MgCl_2/H_2O$ liquid phase. Upon mixing with the MgO, the entire mix instantly becomes carbonated during the curing phase. Carbonating this MOC mix produces MCOC, or Magnesium Carbonate OxyChloride ($Mg_3Cl(OH)5.4H2O$) cement. This is highly water resistant. Pre-carbonating the MOC formula during cure can also be achieved by adding various water soluble carbonates or bicarbonates to the powder phase with the MgO. Such materials found useful include, sodium carbonate, sodium bicarbonate, sodium percarbonate, sodium sesquicarbonate, Trona ($Na_3(CO_3)(HCO_3).2H_2O$), as well the corresponding potassium and lithium salts. This pre-carbonation process can also be achieved by, for example, feeding in pressurized $CO_2$ into the cement matrix with the pressurized feeding of proteinaceous surfactants, or any other aeration agents into the matrix.

An example of using a pre-carbonating agent added with the MgO powder to produce a water resistant wall board in accordance with the disclosure is as follows:

| Composition: | % by Weight: |
|---|---|
| MgO - 3% active lightly calcined | 21 |
| Trona - $Na_3(CO_3)(HCO_3)•2H_2O$ (FMC Corp.) | 3 (pre-mixed with the MgO) |
| $MgCl_2$ - 22° Baume Solution | 15 |
| $H_2O$ | 15 |
| Fly Ash - Class C | 25 |
| Expanded Polystyrene Beads (EPS) | 10 |
| Fiberglass Mesh Scrim | 2 |

The incorporation of carbon dioxide gas into the closed cell structure of the resultant foam also provides for a lighter weight cured material as well as providing a mechanism for carbonating the cementitous phase.

The incorporation of alkaline metal phosphates with magnesium stearate resulted in higher compressive strengths. This was a welcome positive effect. On the negative side, we also obtained increased cure times. We therefore tested various cure accelerators. We found that various metal oxides accelerated cure and overcame the reduction of cure time earlier observed. The types of metal oxides successfully tested include, but are not limited to iron (ii) and (iii) oxide, copper (ii) and (iii) oxide, titanium oxide, zinc oxide, as well as aluminum oxide. These are added to the cement mix at low levels, between 0.1-10% by weight of MgO.

The incorporation of an example of such a formulation is for Industrial Flooring that helps accelerate cure time as well as incorporating an alkaline metal phosphate and alkaline metal soar in accordance with the disclosure is as follows:

| Composition: | % by Weight: |
|---|---|
| MgO - 93% active lightly calcined | 29 |
| $MgCl_2$ - 22° Baume Solution | 20 |
| $H_2O$ | 20 |
| $MgH_2PO_4$ (for water resistance) | 1 |
| Mg Stearate (for enhanced water resistance) | 1 |
| $Fe_2O_3$ (for faster initial cure speed) | 1 |
| Recycled Glass | 18 |
| Fly Ash - Class C | 10 |

While the above the results obtained with the use of the above novel water resistant additives and processes are positive, preventing the leaching of chloride ions means that they remain in the cured cement matrix. The chlorides that remain in the cement can potentially lead to corrosion of metal fasteners or reinforcement materials. Therefore, additional testing was conducted to add various additives to the MOC mixes to mitigate such chloride ion corrosion to metal surfaces. Improved corrosion resistance of MOC matrices that were found to mitigate corrosion are based on zeolites, magnesium nitrite, alone or in combination with magnesium mono- or di-hydrogen phosphate, mono- or di-potassium phosphate and mono- or di-lithium phosphates. The above mentioned corrosion inhibitors are added to the cement matrix at a level of approximately 0.1-10.0% by weight of MgO. For example a, illustrative mix in accordance with the disclosure containing magnesium nitrite (1.0%) could include:

Magnesium oxide—326 g
Magnesium Chloride—224 g
Magnesium nitrite—3.26 g
Water—214 g An example of a formulated building material in accordance with the disclosure is as follows:

| Composition: | % by Weight: |
|---|---|
| MgO - 3% active lightly calcined | 21 |
| $MgCl_2$ - 22° Baume Solution | 15 |
| $H_2O$ | 15 |
| Mg Nitrite (for corrosion resistance) | 1 |
| Zeolite | 1 |
| $MgH_2PO_4$ (for water resistance) | 1 |
| Expanded Polystyrene Beads (EPS) | 8 |
| Recycled Cellulose | 14 |
| Fly Ash - Class C | 24 |

It is believed that these materials provide passivation to the surface of metals such as iron, aluminum, lead, zinc and other metals and prevent or minimize further surface oxidation.

The use of the binder system in accordance with the disclosure provides a water resistant and/or corrosion resistant characteristic; possessing a highly tenacious bonding capability. As such, these formulations can be highly filled (as high as 70% or more by weight of the MgO) with the following filler materials: wood saw dust, calcium carbonate, magnesium carbonate, expanded polystyrene or other polymeric foam beads, aeration additives, perlite, zeolite, silica sand, glass beads, fly ash, diatomaceous earth, ceramic fibers; recycled materials such as rubber, cellulose, glass, carpet and carpet backing, and many more.

An example of such a formulation in accordance with the disclosure is as follows:

| Composition: | % by Weight: |
|---|---|
| MgO - 3% active lightly calcined | 15 |
| $MgCl_2$ - 22° Baume Solution | 10 |
| $H_2O$ | 10 |
| $MgH_2PO_4$ (for water resistance) | 1 |
| Mg Nitrite (for corrosion resistance) | 1 |
| Expanded Polystyrene Beads (EPS) | 8 |
| Recycled carpet fibers | 15 |
| Fly Ash - Class C | 20 |
| Perlite | 20 |

The water resistance and corrosion resistance enhancements found in testing with the MOC cement are also effective with Magnesium OxySulfate (MOS) cement formulations. MOS cements have inherent issues of lack of water resistance and corrosion problems similar to those of MOC cement. A difference in the chemistries of MOS and MOC arises from the reaction of MgO with Magnesium Sulfate ($MgSO_4$), instead of with $MgCl_2$. Four oxysulfate phases are typically formed at temperatures ranging between 30° C. and 120° C. These 4 phases are; $5Mg(OH)_2.MgSO_4.3H_2O$ (5-form), $3Mg(OH)_2.MgSO_4.8H_2O$ (3-form), $Mg(OH)_2.MgSO_4.5H_2O$, and $Mg(OH)_2.2MgSO_4.3H_2O$. Although only the 3-form is stable under 35° C., the additives described herein for improved water resistance and corrosion resistance for MOC cements, were also found to be effective in Magnesium OxyChloride cements.

An example of such a water and corrosion resistant MOS lightweight insulating panel formulation is as follows:

| Composition: | % by Weight: |
|---|---|
| MgO - 93% active lightly calcined | 25 |
| $MgSO_4$ | 17 |
| $H_2O$ | 17 |
| $MgH_2PO_4$ (for water resistance) | 1 |
| Mg Nitrite (for enhanced corrosion resistance) | 1 |
| Perlite | 19 |
| Fly Ash - Class C | 20 |

Having thus described several embodiments of the present disclosure, it will be apparent that modifications and variations are possible without departing from the scope of the invention defined in the appended claims.

The invention claimed is:

1. A composition comprising:
at least one of a molar ratio of magnesium oxychloride cement comprising MgO: $MgCl_2$ ranging from about 10:1 to about 3:1 and a molar ratio of $H_2O$: $MgCl_2$ ranging from about 18:1 to about 13:1; and a molar ratio of magnesium oxysulfate cement comprising MgO: MgSO4 ranging from about 7:1 to about 1:1, and a molar ratio of H2O: MgSO4 ranging from about 1:7 to about 2:1; and
at least one alkali metal phosphate selected from the group consisting of sodium mono hydrogen phosphate, sodium di-hydrogen phosphate, magnesium mono hydrogen phosphate, magnesium di-hydrogen phosphate, lithium mono hydrogen phosphate and lithium di-hydrogen phosphate.

2. A composition according to claim 1, further comprising a metal sulfate.

3. A composition according to claim 2, wherein the metal sulfate comprises at least one of aluminum sulfate, copper sulfate, zinc sulfate, and iron sulfate.

4. A composition according to claim 1, further comprising silica.

5. A composition according to claim 4, wherein the silica comprises colloidal silica.

6. A composition according to claim 5, wherein the colloidal silica is added in the range of approximately 0.1-approximately 10% by weight MgO.

7. A composition according to claim 2, wherein the amount of metal sulfate added is in the range of approximately 0.1-approximately 10% by weight of MgO.

8. A composition according to claim 1, further comprising:
at least one of: $Na_3(CO_3)(HCO_3)*2H_2O$, $Na_2CO_3$, and $NaHCO_3$ added in the range of approximately 0.1-approximately 10% by weight MgO.

9. A composition according to claim 8, wherein the composition includes $Na_3(CO_3)(HCO_3)*2H_2O$ in the range of approximately 0.1- approximately 10% by weight MgO.

10. A composition according to claim 8, wherein the composition includes $Na_2CO_3$ in the range of approximately 0.1-approximately 10% by weight MgO.

11. A composition according to claim 8, wherein the composition includes $NaHCO_3$ in the range of approximately 0.1-approximately 10% by weight MgO.

12. A composition according to claim 1, further comprising an alkali metal fatty acid.

13. A composition according to claim 12, wherein the alkali metal fatty acid comprises at least one of magnesium stearate and magnesium oleate.

14. A composition according to claim 13, wherein the alkali metal fatty acid is added in the range of approximately 0.1-approximately 10% by weight MgO.

15. A composition according to claim 1, wherein the MgO comprises a MgO selected from the range of a light burned MgO through a dead burned MgO.

16. A composition according to claim 1, further comprising at least one of a zeolite and magnesium nitrite.

17. A composition according to claim 1, further comprising a filler material.

18. A composition according to claim 17, wherein the filler material is added up to approximately 70% by weight of the MgO.

19. A composition according to claim 18, wherein the filler material includes at least one of: wood saw dust, calcium carbonate, magnesium carbonate, expanded polystyrene or other polymeric foam beads, aeration additives, perlite, zeolite, silica sand, glass beads, fly ash, diatomaceous earth, ceramic fibers, and recycled material.

20. A composition according to claim 1, further comprising metal oxides including at least one of: iron (ii) & (iii) oxide, copper (i) & (ii) oxide, titanium oxide, zinc oxide, and aluminum oxide added in the range of approximately 0.1-approximately 10% by weight MgO.

21. A composition according to claim 11, wherein the metal oxides comprise between approximately 0.1-approximately 10% by weight of MgO.

22. A process for making a magnesium oxychloride cement, including:
forming at least one of a molar ratio of magnesium oxychloride cement comprising MgO: $MgCl_2$ ranging from about 10:1 to about 3:1 and a molar ratio of $H_2O$: $MgCl_2$ ranging from about 18:1 to about 13:1; and a molar ratio of magnesium oxysulfate cement comprising MgO: MgSO4 ranging from about 7:1 to about 1:1, and a molar ratio of H2O: MgSO4 ranging from about 1:7 to about 2:1; and
adding at least one alkali metal phosphate selected from the group consisting of sodium mono hydrogen phosphate, sodium di-hydrogen phosphate, magnesium mono hydrogen phosphate, magnesium di-hydrogen phosphate, lithium mono hydrogen phosphate and lithium di-hydrogen phosphate.

23. The process according to claim 22, further comprising adding a metal sulfate.

24. The process according to claim 23, wherein the metal sulfate comprises at least one of aluminum sulfate, copper sulfate, zinc sulfate, and iron sulfate.

25. The process according to claim 22, further comprising adding silica.

26. The process according to claim 25, wherein the silica comprises colloidal silica.

27. The process according to claim 26, wherein the colloidal silica is added in the range of approximately 0.1-approximately 10% by weight MgO.

28. The process according to claim 23, wherein the amount of metal sulfate added is in the range of approximately 0.1-approximately 10% by weight of MgO.

29. The process according to claim 22 further including:
adding at least one of: $Na_3(CO_3)(HCO_3)*2H_2O$, $Na_2CO_3$, and $NaHCO_3$.

30. The process according to claim 22 further including:
bubbling $CO_2$ through the $H_2O$.

31. The process according to claim 22 further including:
bubbling $CO_2$ through the cement.

32. The process according to claim 22 wherein the $Na_3(CO_3)(HCO_3)*2H_2O$ is added in the range of approximately 0.1-approximately 10% by weight MgO.

33. The process according to claim 22 wherein the $Na_2CO_3$ is added in the range of approximately 0.1-approximately 10% by weight MgO.

34. The process according to claim 22 wherein the $NaHCO_3$ is added in the range of approximately 0.1-approximately 10% by weight MgO.

35. The process according to claim 22, further comprising adding an alkali metal fatty acid.

36. The process according to claim 35, wherein the alkali metal fatty acid comprises at least one of magnesium stearate and magnesium oleate.

37. The process according to claim 35, wherein the alkali metal fatty acid is added in the range of approximately 0.1-approximately 10% by weight MgO.

38. The process according to claim 22, wherein the MgO comprises a MgO in the range of a light burned MgO through a dead burned MgO.

39. The process according to claim 22, further comprising adding at least one of a zeolite and magnesium nitrite.

40. The process according to claim 39, further comprising adding at least one of mono potassium phosphate, di-potassium phosphate and mono lithium phosphate and di-lithium phosphate.

41. The process according to claim 22, further comprising adding a filler material.

42. The process according to claim 41, wherein the filler material is added up to approximately 70% by weight of the MgO.

43. The process according to claim 42, wherein the filler material includes at least one of: wood saw dust, calcium carbonate, magnesium carbonate, expanded polystyrene or other polymeric foam beads, aeration additives, perlite, zeolite, silica sand, glass beads, fly ash, diatomaceous earth, ceramic fibers, and recycled material.

44. The process according to claim 22, further comprising adding metal oxides including at least one of: iron (ii) & (iii) oxide, copper (i) & (ii) oxide, titanium oxide, zinc oxide, and aluminum oxide added in the range of approximately 0.1-approximately 10% by weight MgO.

45. The process according to claim 44, wherein the metal oxides comprise between approximately 0.1-approximately 10% by weight of MgO.

46. The process according to claim 31, further comprising adding an aerating agent.

47. The process according to claim 46, wherein the aerating agent comprises a proteinaceous surfactant.

48. The composition according to claim 1, wherein the $H_2O$ includes carbonated $H_2O$.

49. The composition according to claim 1, further comprising a carbonate source.

50. The composition according to claim 16, further comprising at least one of mono potassium phosphate, di-potassium phosphate and mono lithium phosphate and di-lithium phosphate.

51. The composition according to claim 1, further comprising an aerating agent.

52. The composition according to claim 51, wherein the aerating agent comprises a proteinaceous surfactant.

53. The composition according to claim 19, wherein the recycled material is selected from the group consisting of rubber, cellulose, glass, carpet, and carpet backing.

54. The composition according to claim 43, wherein the recycled material selected from the group consisting of rubber, cellulose, glass, carpet, and carpet backing.

* * * * *